United States Patent
Lin Tien

(10) Patent No.: US 6,327,965 B1
(45) Date of Patent: Dec. 11, 2001

(54) SAFETY AND DRAIN-PREVENTING INFUSING TEA MAKER

(76) Inventor: Yu-Mei Lin Tien, 4Fl., No. 24, Lane 4, Alley 345, Sec. 4, Jen Ai Rd., Taipei (TW)

( * ) Notice: Subject to any disclaimer, the term of this patent is extended or adjusted under 35 U.S.C. 154(b) by 0 days.

(21) Appl. No.: 09/609,707

(22) Filed: Jul. 3, 2000

(51) Int. Cl.[7] ................................................ A47J 31/02
(52) U.S. Cl. ............................... 99/299; 99/306; 99/317; 99/323
(58) Field of Search .............................. 99/299, 305, 323, 99/306, 304, 317, 279; 210/474, 477, 478, 479, 181

(56) References Cited

U.S. PATENT DOCUMENTS

| | | | |
|---|---|---|---|
| 5,249,509 | * 10/1993 | English | 99/299 X |
| 5,813,317 | * 9/1998 | Chang | 99/299 X |
| 5,826,493 | * 10/1998 | Tien Lin | 99/299 X |

* cited by examiner

Primary Examiner—Reginald L. Alexander
(74) Attorney, Agent, or Firm—Rosenberg, Klein & Lee

(57) ABSTRACT

A safety and drain-preventing infusing tea maker comprises a cup body, a stop, a filtering net, and a retaining plate. The stop and the filtering net are contained in the penetrating hole at the bottom of the cup body. A plurality of leg plates extend downwards from the bottom thereof and a mask is formed at the periphery thereof so that the retaining plate having through hole for being penetrated by the leg plate can be hidden in the mask to be moved therein. When the retaining plate is descended to a lowest position, it is lower then the lower rim of the mask and protrudes slightly therefrom without being lower than the lower ends of the leg plates. As a consequent, not only the retaining plate is covered by the mask for preventing an error contact, but also any container with a diameter smaller than that of the retaining plate can be used for containing the infusing tea maker. When the infusing tea maker is placed on the container, the protruding retaining plate will at first contact with the container so as to be ejected upwards. Thus, the tea water can be poured out successfully. Not only it is convenient and safe in use, but also it can be widely used at any container.

13 Claims, 11 Drawing Sheets

SAFETY AND DRAIN-PREVENTING INFUSING TEA MAKER

FIELD OF THE INVENTION

The present invention relates to an infusing tea maker. The infusing tea maker of the present invention can be placed by a simple action and selectively positioned in any container with any diameter or on a plane, and then tea therein can be poured out automatically or stopped automatically. Moreover, by a special improvement, it can prevent that the tea is drained out due to a mistake contact. The present invention can be widely used in various container. Therefore, the present invention is an infusing tea maker with safely draining preventing ability.

BACKGROUND OF THE INVENTION

Conventionally, tea is directly put into a container and then hot water is poured. After several minutes, a fragrant tea is acquired. However, when less water is in the container, the tealeaves remain in the container. The remained tea water has a higher concentration with more impurity. Furthermore, the fragrant odor of the tea will gradually disappear. Therefore, U.S. Pat. No. 5,826,493, "INFUSION COFFER MAKER", is disclosed by the applicant. As shown in FIG. 1, in the patent, the bottom of the cup body 60 is installed with a protruding ring 600. A plurality of vertical long holes 601 and leg plates 602 are installed on the protruding ring 600. A retaining plate 61 is further installed. A sleeve 611 with posts 610 and through holes 612 are formed on the retaining plate 61. Therefore, by the posts 610 to insert into the long holes 601 and the through hole 612 is inserted by the leg plates 602, the retaining plate 61 can move with respect to the a cup body 60. The center of the retaining plate 61 is further installed with a stop 62 at the center thereof for being inserted into the penetrating hole to seal the penetrating hole as desired. Therefore, the cup body 61 can be placed on a place by solely the leg plates 602. If the retaining plate 61 is descended due to the gravitational force thereof, the stop 62 will seal the penetrating hole 63 for stopping water. When the user places in a container 7 with a diameter not larger than that of the cup body 61, the stop 62 will eject the container 7 upwards, so that the rod 613 will eject the stop 62, and the water in the cup body will pour out. The use is convenient.

If using this aforesaid structure, it is convenient. However, since the retaining plate 61 is larger and protrudes, it is possible to be touched by the user due to a mistake, so that the stop 62 is ejected from the penetrating hole to cause water to be poured out slightly. Thus, a secondary structure, "TEA INFUSING DEVICE", U.S. application Ser. No. 09/464476, is disclosed by the applicant. As shown in FIG. 2, the tea infusing device is extended from the first structure of FIG. 1, in which no leg plate (602, FIG. 1) is installed, and the diameter of the retaining plate 61 is smaller than that of the protruding ring 600 so as to be received therein. When the retaining plate 61 is descended to a lowest position, it remains not to be lower than the lower rim of the protruding ring 600. When the tea infusing device is flatly placed on a plane, it is supported by the protruding ring 600. Thus, the whole periphery of the retaining plate 61 is protected by the protruding ring 600 so as to effectively prevent the cup body to be touched by a mistake.

However, the second structure has still some defects as used with the prior art container. There are some fewer containers 7 (As shown in FIG. 2) having a diameter not larger than that of the retaining plate 61 so as to be suitably used with the tea infusing device of the present invention, while unluckily, one lateral side thereof has a protruding mouth 70 and or handle 71, so that as the tea infusing device is placed on the container, the mouth 70 or handle 71 will at first eject the protruding ring 600 so that the retaining plate 61 originally hidden in the protruding ring 600 can not be ejected by the container for pouring water. Although the containers with such structure, mouths or handle, are not much. However, it is desired to have a novel safety and drain-preventing infusing tea maker for further suiting such structures in order to improve the defects in the prior art.

SUMMARY OF THE INVENTION

Accordingly, the primary object of the present invention is to provide a safety and drain-preventing infusing tea maker for preventing a mistake. Any container with a diameter smaller than that of the retaining plate can be used for containing the infusing tea maker.

In order to achieve aforesaid object, the present invention provides a safety and drain-preventing infusing tea maker. A mask for completely containing the whole retaining plate, and the bottom thereof extends downwards with a plurality of leg plates and a mask is formed at the periphery thereof so that the retaining plate having through hole for being penetrated by the leg plate can be hidden in the mask to be moved therein. When the retaining plate is descended to a lowest position, it is lower then the lower rim of the mask and protrudes slightly therefrom without being lower that the lower ends of the leg plates. As a consequent, not only the retaining plate is covered by the mask for preventing an error contact, but also any container with a diameter smaller than that of the retaining plate can be used for containing the infusing tea maker. When the infusing tea maker is placed on the container, the protruding retaining plate will at first contact with the container so as to be ejected upwards. Thus, the tea water can be poured out successfully. Not only it is convenient and safe in use, but also it can be widely used at any container.

The various objects and advantages of the present invention will be more readily understood from the following detailed description when reading in conjunction with the appended drawing.

DETAILED DESCRIPTION OF THE PREFERRED EMBODIMENTS

Figure 1:
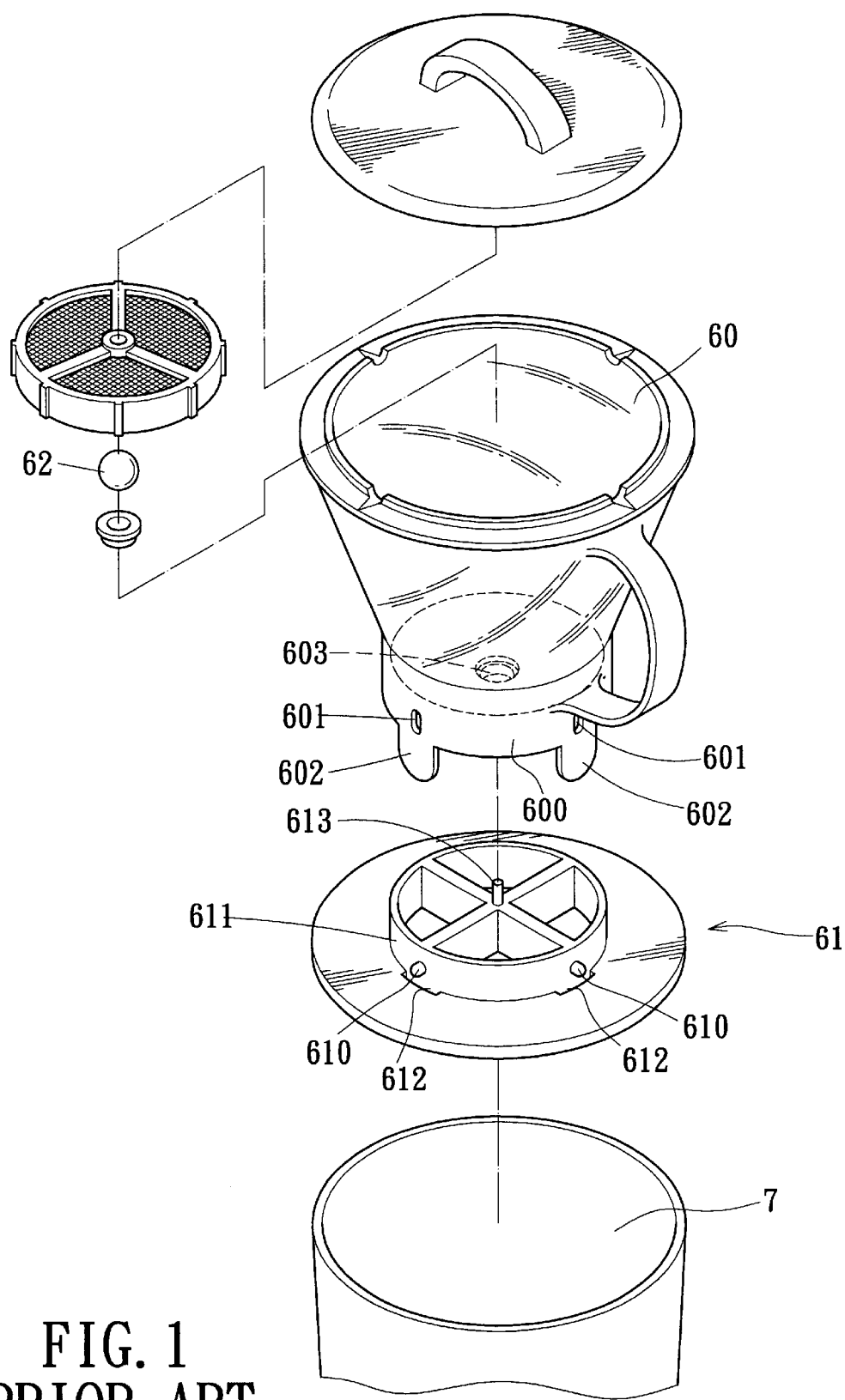
FIG. 1 is an exploded perspective view of the infusing coffee maker disclosed in U.S. Pat. No. 5,826,493.
Figure 2:
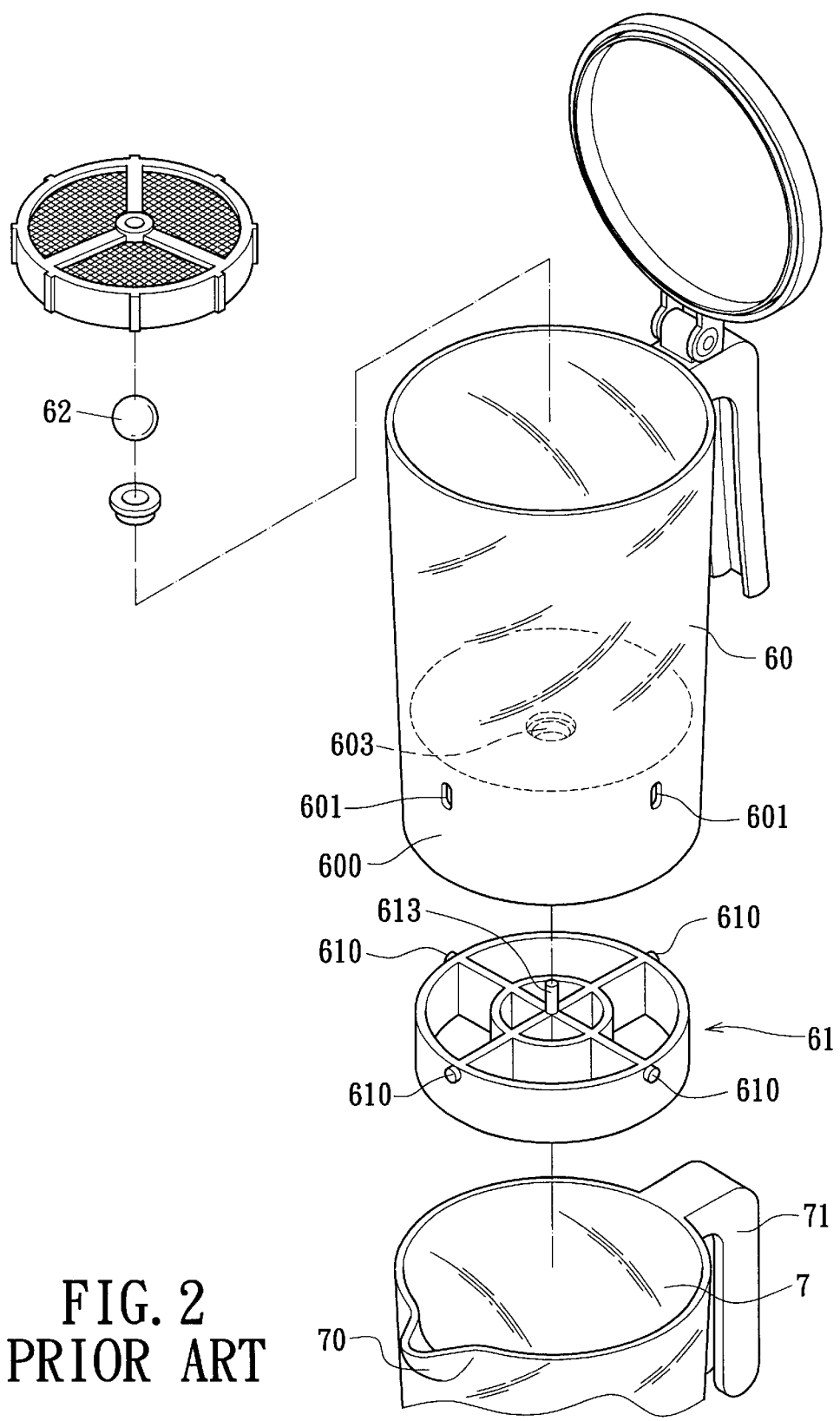
FIG. 2 is an exploded perspective view of the tea infusion device disclosed in U.S. application Ser. No. 09/464,476.
Figure 3:
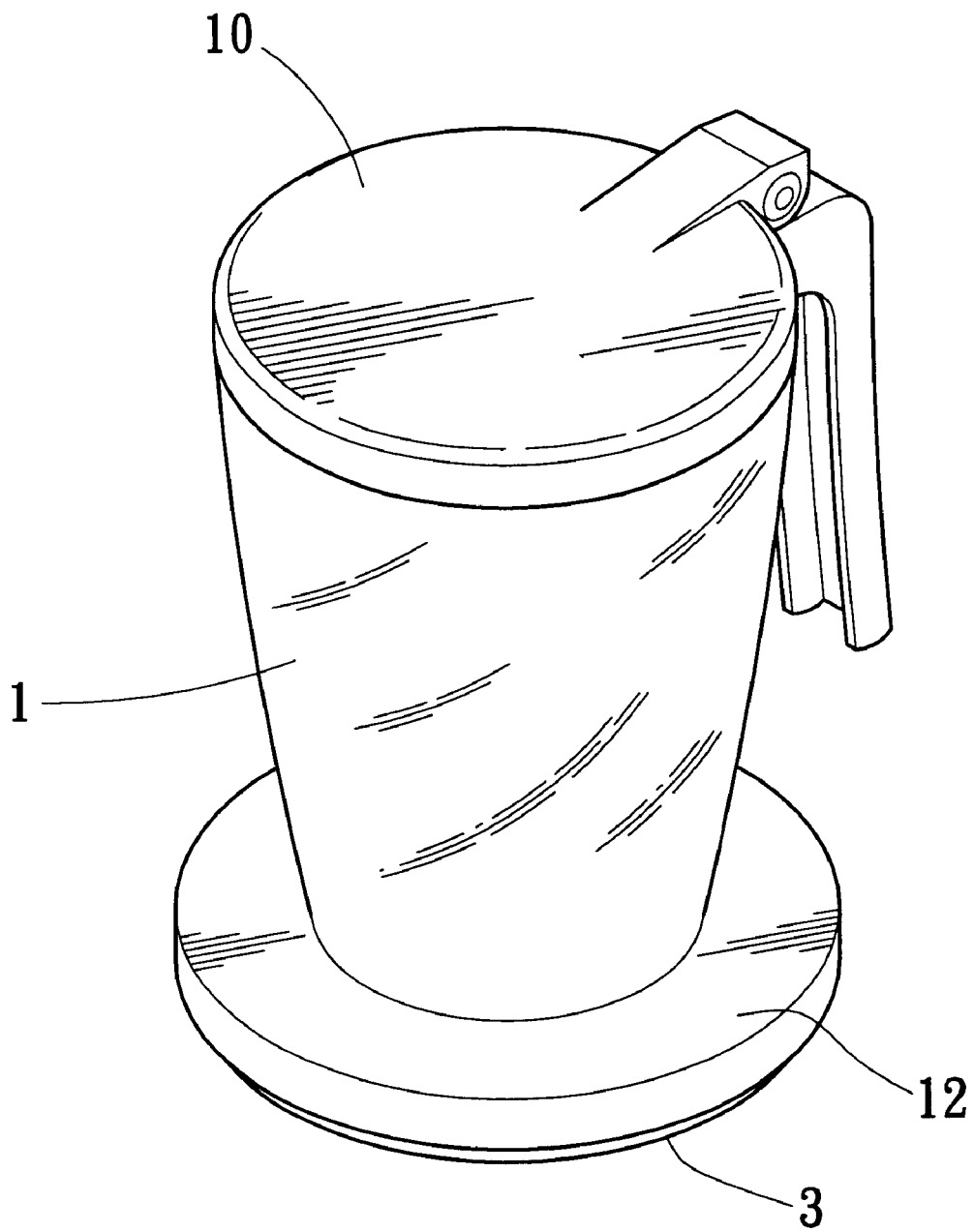
FIG. 3 is a perspective view of the present invention.
Figure 4:
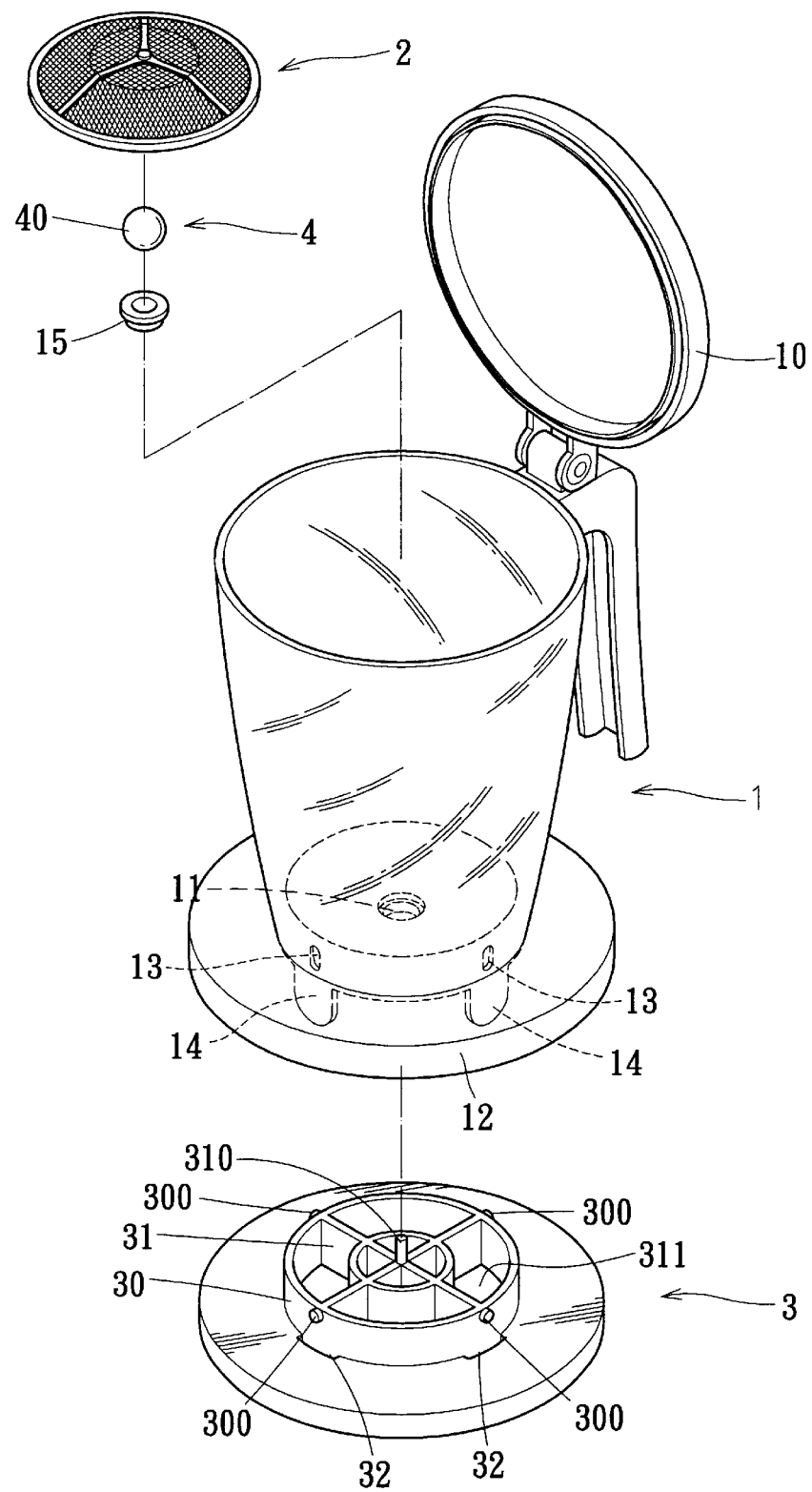
FIG. 4 is an exploded perspective view of the present invention.

With reference to FIGS. 3 and 4, the safety and drain-preventing infusing tea maker in the present invention is illustrated herein. The infusing tea maker of the present invention includes a cup body 1, a filtering net 2, a retaining plate 3 and a stop 4.

The cup body 1 has a cover 10. The center of the bottom of the cup body is formed with a penetrating hole 11. The penetrating hole 11 is installed with an elastic stopping ring 15 and a stop 4. The stop 4 is a roller 40 made of metal, silicon, or other any material, and a filtering net 2 is installed thereon. The bottom of the filtering net 2 is installed with a positioning piece for confining lateral movement of the roller 40. The bottom of the cup body 1 is circularly installed with a plurality of vertical sliding grooves 13 (or penetrating sliding hole) which are spaced in an equal space and extends downwards with a plurality of leg plates 14, the grooves 13 and leg plates 14 are paired with one another. An enlarged mask 12 with a proper height is formed around the periphery of the bottom of the cup body.

The retaining plate 3 has a diameter smaller than the inner diameter of the mask 12 and can be wholly received in the mask 12. The retaining plate 3 is formed with ribs 31, via holes 311, and sleeve 30 for confining the central rod 310. A plurality of posts 300 are installed at the periphery of the sleeve 30. The retaining plate 3 is formed with a plurality of through holes 32 for being penetrating by the leg plates 14 so that the retaining plate 3 may move with respect to the cup body 1. It should be especially noted that even the retaining plate 3 descends to a lowest position. The bottom thereof remains lower than bottom rim of the mask 12 so as to slight protrude downwards, but not to lower than the lower end of the leg plates.

Figure 5:
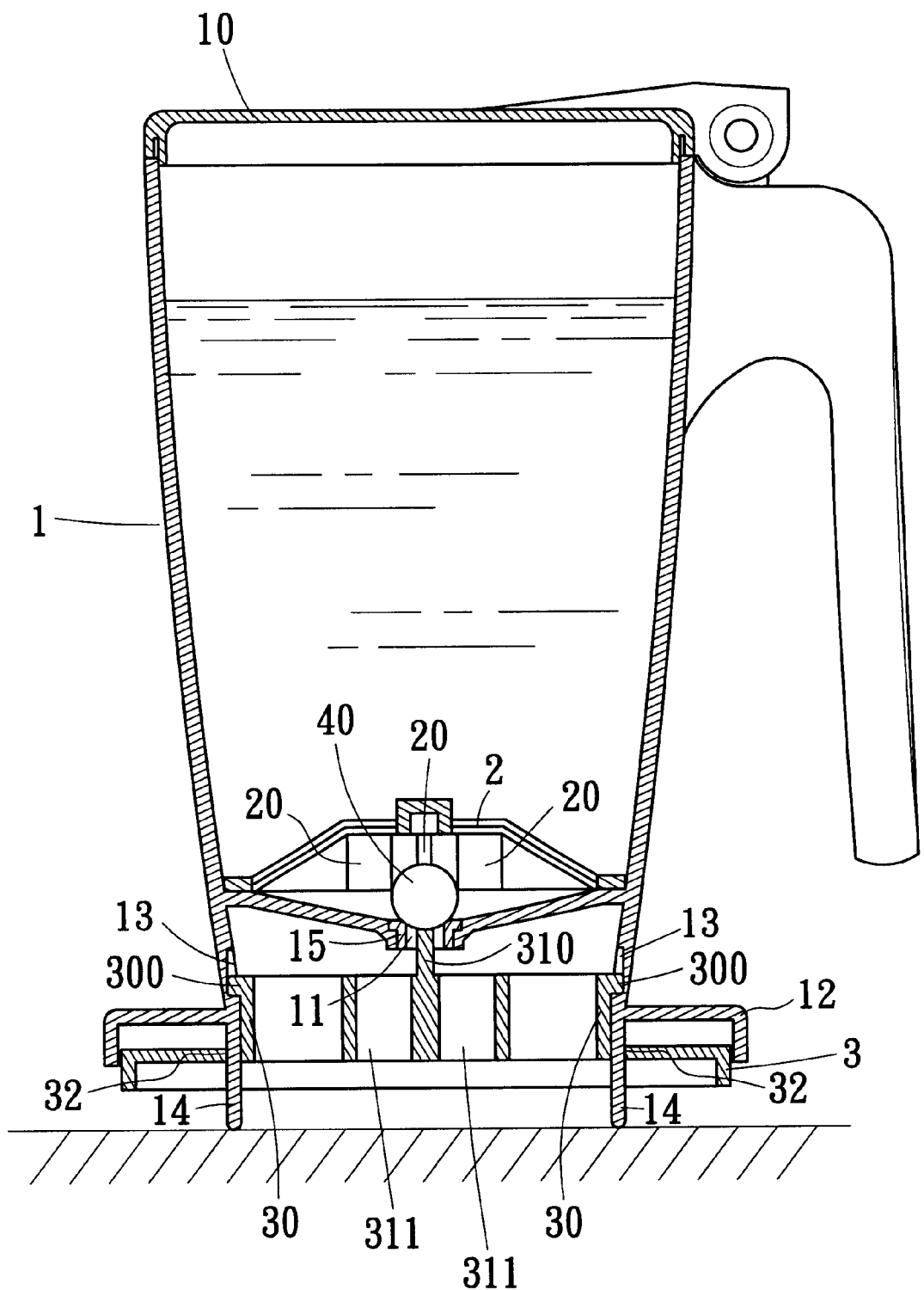
FIG. 5 is a lateral cross sectional view showing the present invention is flatly placed on any plane to be in water stopping condition.
Figure 6:
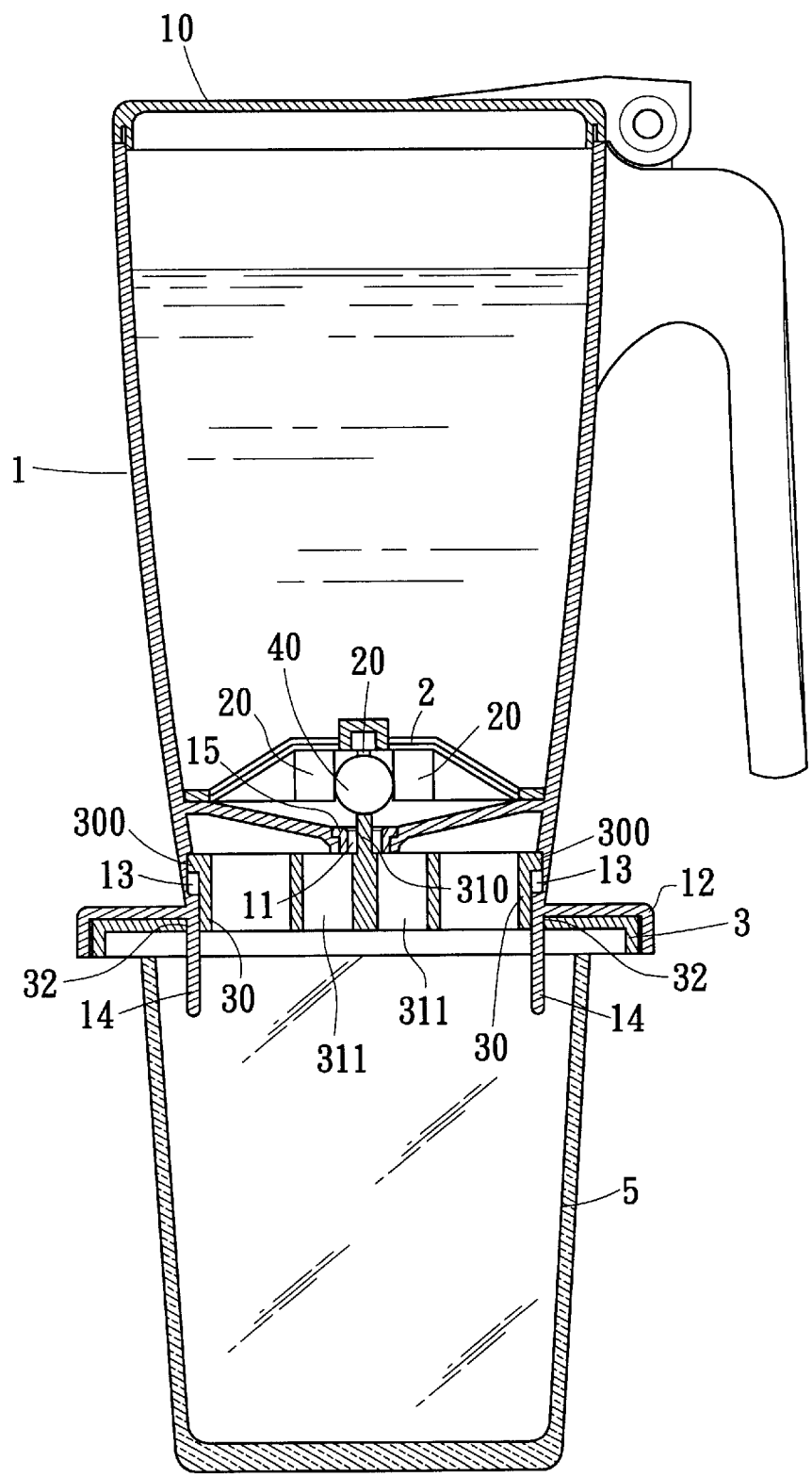
FIG. 6 is a lateral cross sectional view showing the present invention is flatly placed on any plane to be in water draining condition.

By aforesaid components, an infusing tea maker shown in FIG. 3 can be assembled. Therefore, as shown in FIG. 5, when the cup body 1 is flatly arranged on a plane, such as table surface, and tea and hot water is poured therein, since the cup body is supported by the leg plates 14. By the gravitational force, the retaining plate 3 will slide downwards by the posts 13 to move along the long holes 13 so that the central rod 310 inserts into the penetrating hole 11 and thus, the roller 40 will seal the penetrating hole 11 by the gravitation force thereof and the pressure of hot water. Therefore, tea can be poured in the water therein. When tea water is desired to be taken out for using, as shown in FIG. 6, it is only necessary to place the cup body 1 in any container 5 with a diameter smaller than the mask 12. The container 5 ejects the retaining plate 3 upwards so that the rod 310 will eject the roller 40 to leave from the penetrating hole 11. The water in the cup body 1 can be poured to the container 5 successfully. Therefore, the operation is easily. Only action of placing the cup body in the container is necessary.

The descending and lifting of the retaining plate 3 is wholly performed in the mask 12. Therefore, the retaining plate 3 will not be contacted laterally. Even it slightly protrudes to the lower side of the mask 12, it is only needed to reduce the diameter of the retaining plate 3 with respect to the mask 12. Thus contact from ambient objects can be avoided effectively, and thus the roller 41 will not be ejected further so as to cause water to be drained out. As a consequent, it can assure that the infusing tea maker can be used safely. Besides, since the infusing tea maker is separated with the container 5, the cup body 1 can separate with the container 5 to be used independently. When water in the container is poured out, the infusing tea maker can be taken out without tilting the container. Thus, the roller 40 will separate from the penetrating hole 11 due to vibration. As a result, a preferred water sealing is assured and a convenient using is acquired.

Figure 7:
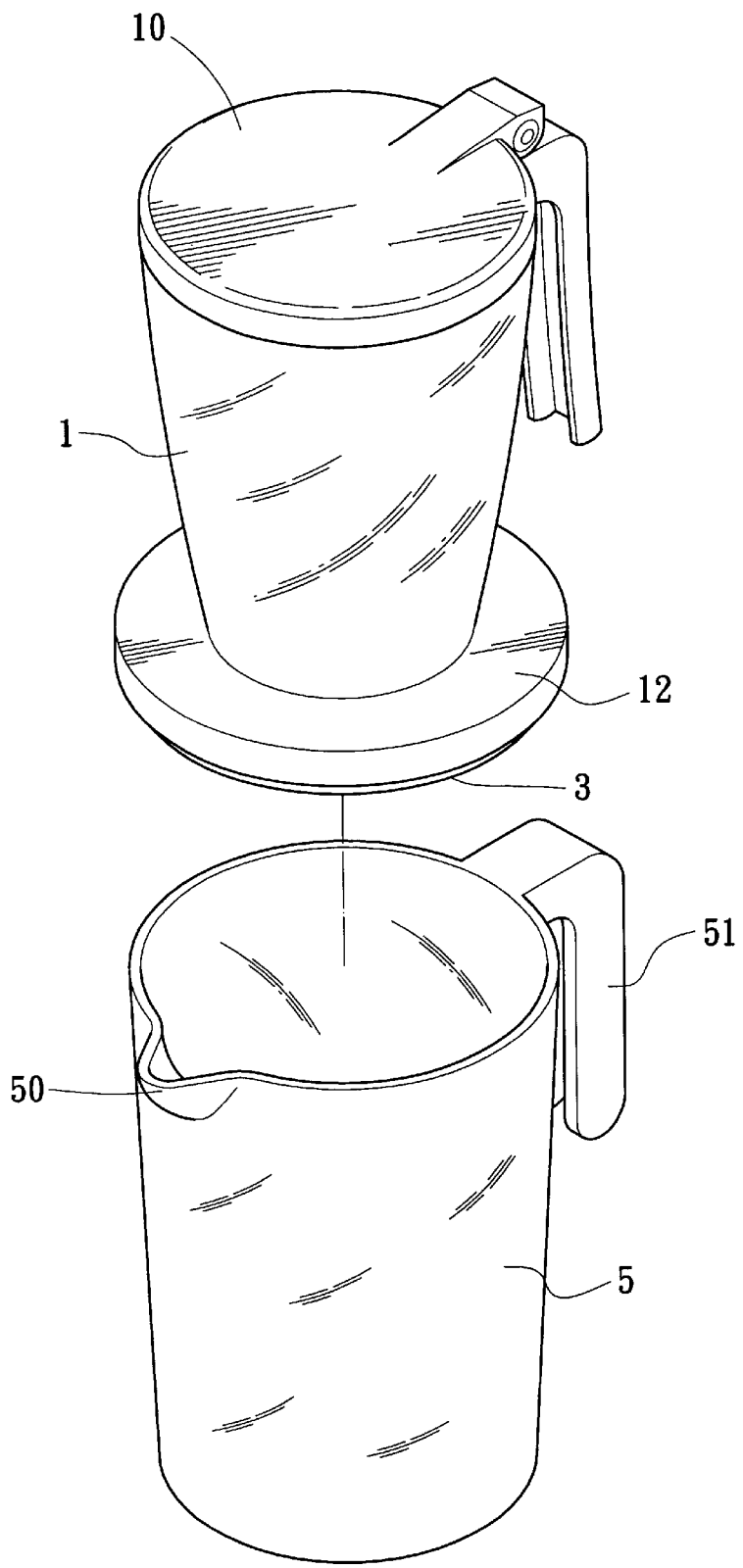
FIG. 7 is a perspective view showing that the present invention is to be placed to a container with a mouth and a handle.
Figure 8:
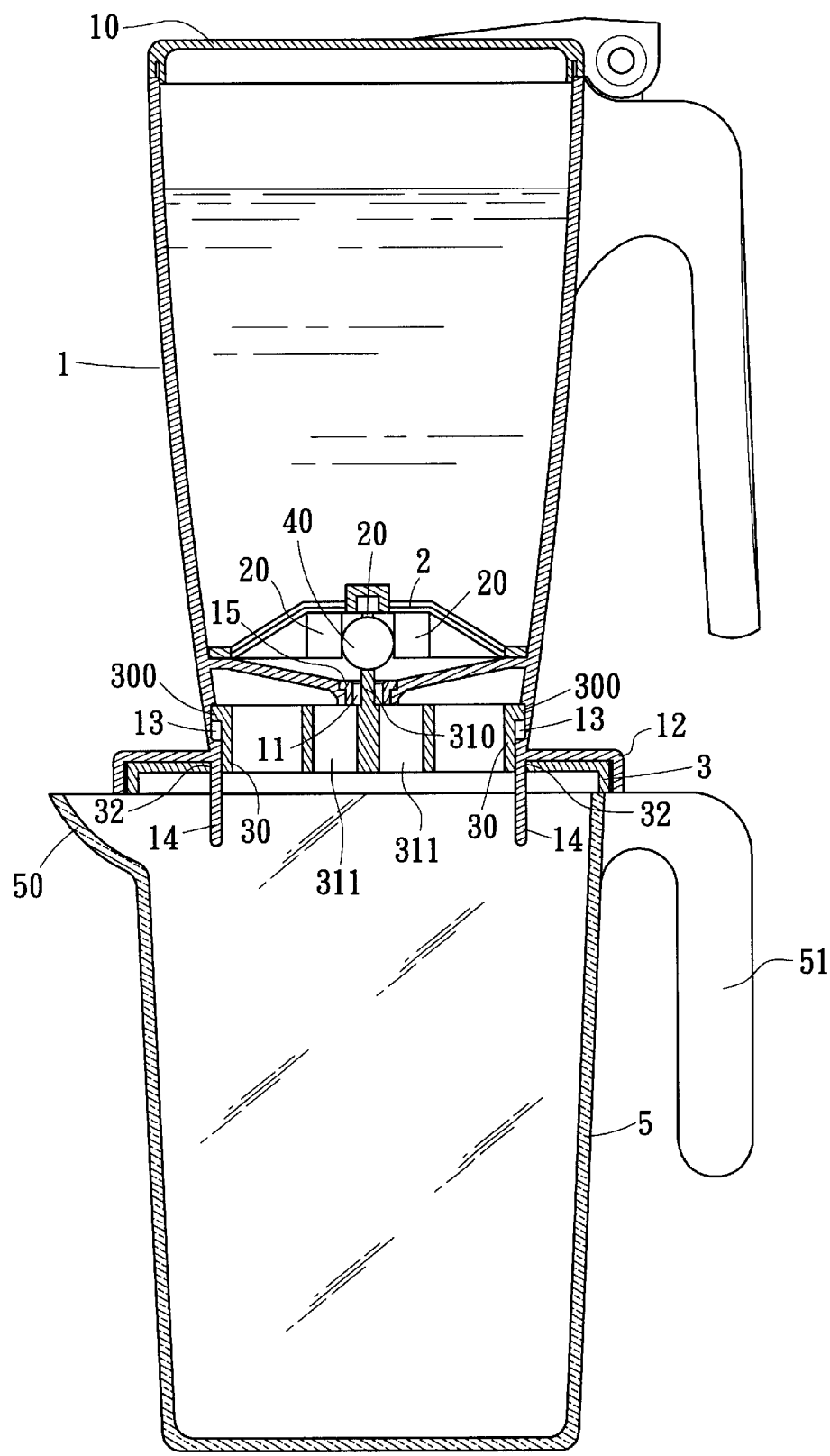
FIG. 8 is a perspective view showing that the present invention is placed to a container with a mouth and a handle.

From above description, it is clearly that any container with a diameter not larger than that of the retaining plate 3 can be served. However, as shown in FIG. 7 and 8, even a container 51 with a diameter not larger than that of the retaining plate 3 has a mouth 50 and a handle 51, the infusing tea maker of the present invention remains to be placed on the opening thereof directly. It is only needed that the mouth 50, handle 51 or any rim portion ejects against the downwards protruding retaining plate 3. The retaining plate 3 remains to be ejected upwards to achieve the object of drain-preventing. Therefore, the infusing tea maker of the present invention can be used in various container and used conveniently.

Figure 9:
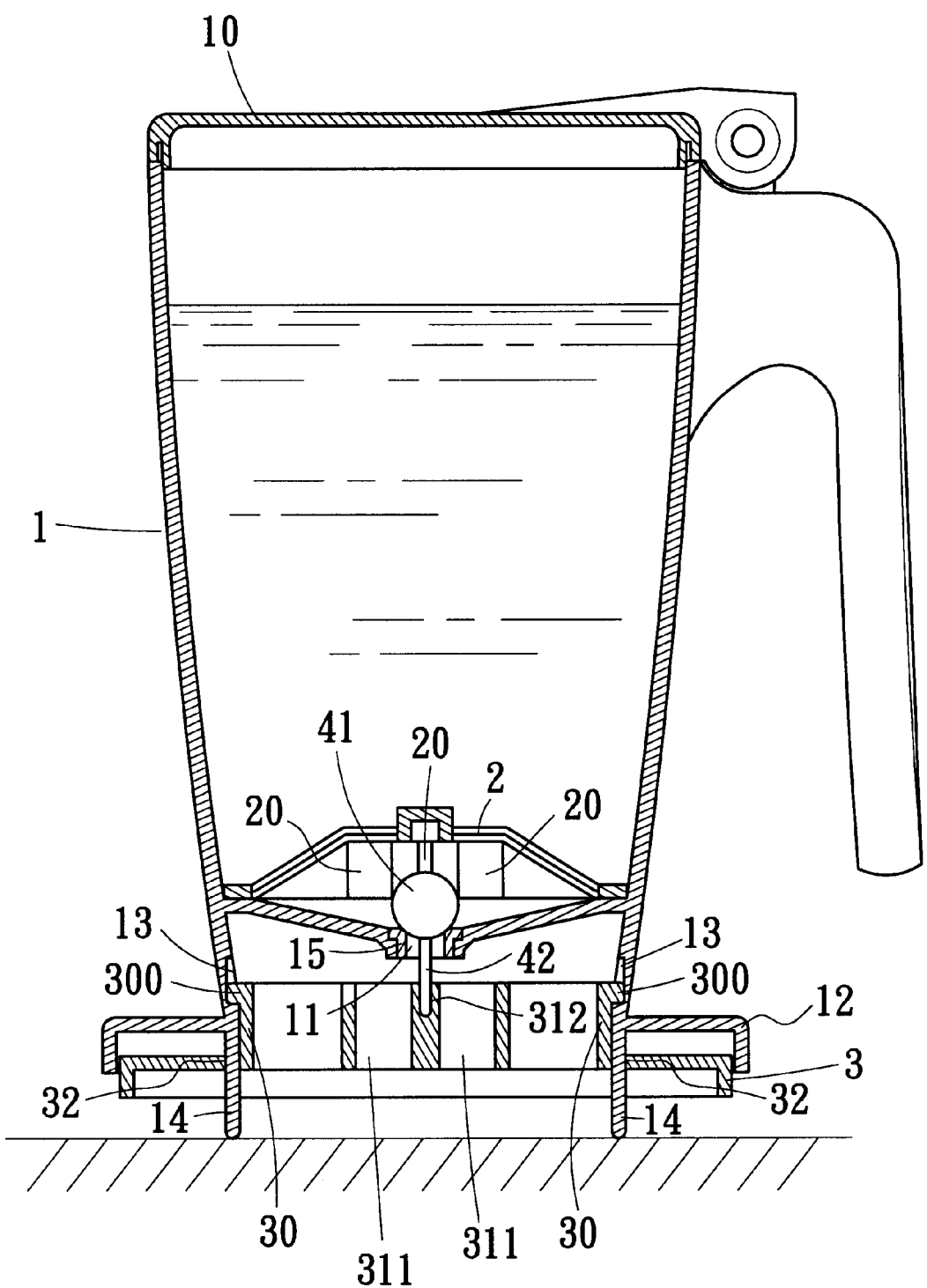
FIG. 9 is a lateral cross sectional view showing the present invention being in another stopping condition different from that in FIG. 5.
Figure 10:
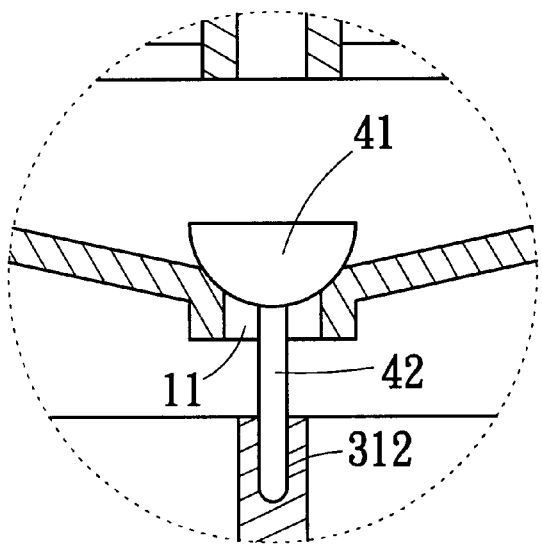
FIG. 10 is an enlarged lateral view showing the present invention being in a further stopping condition different from that in FIG. 5.
Figure 11:
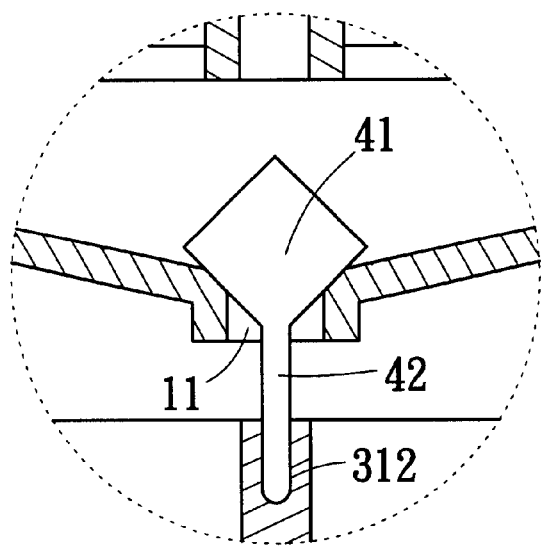
FIG. 11 is an enlarged lateral view showing the present invention being in a yet stopping condition different from that in FIG. 5.
Figure 12:
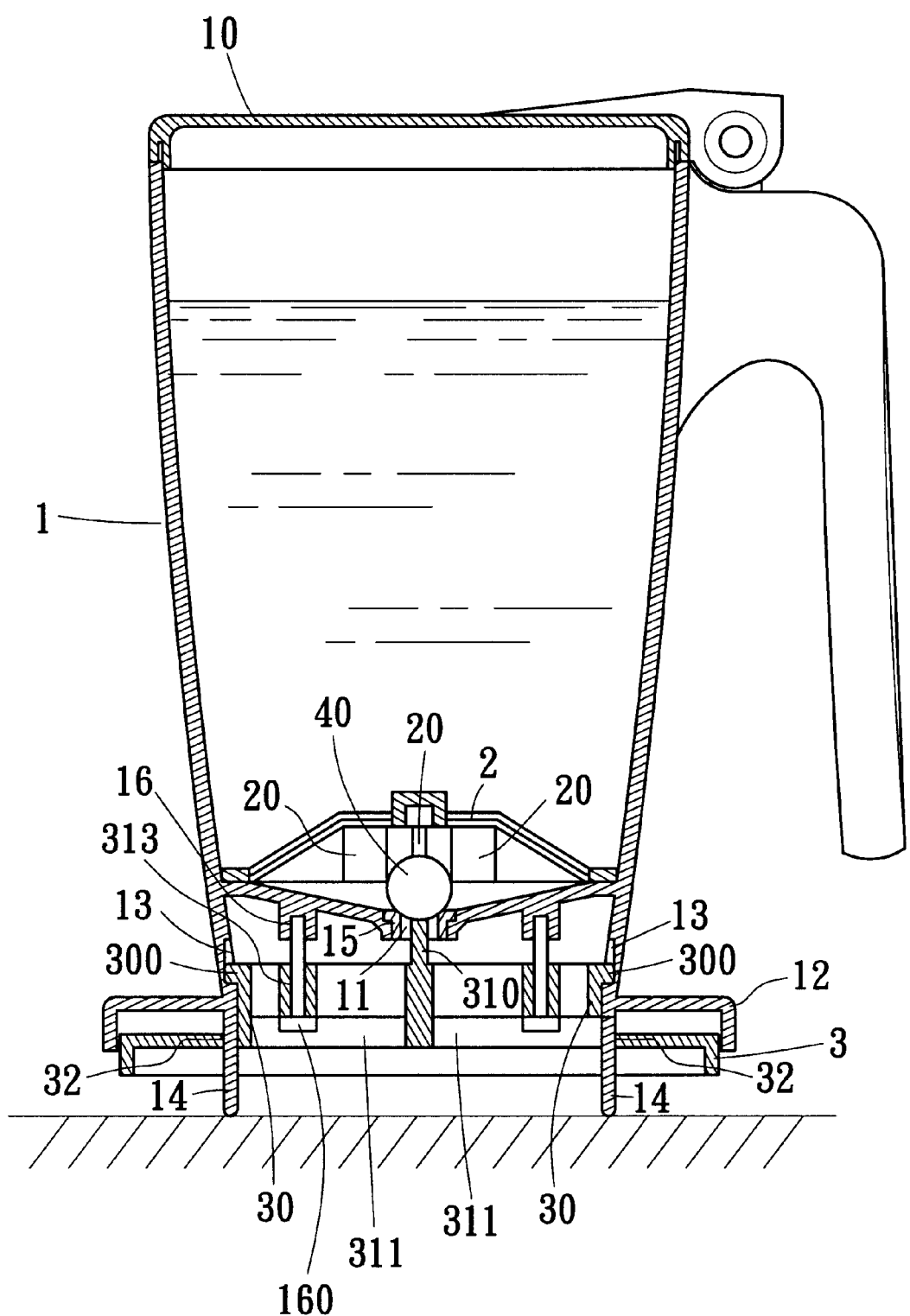
FIG. 12 is a lateral cross sectional view showing the lifting means of the retaining plate of present invention different from that in FIG. 5.

Besides, the stop 4 may have various types, as shown in FIGS. 9, 10, and 11, three embodiments of the stop 4 are illustrated, wherein the stop body 41 and rod 42 have ball, hemispherical, or prism shape so as to be inserted into the hole 312 in the center of the retaining plate. Furthermore, the lifting means of the retaining plate 3 may be as shown in FIG. 12, i.e. a plurality of through holes 133 and inserting holes 15 are formed, respectively, on the ribs of the retaining plate 3 and the bottom of the cup body so that a rod 160 with a length longer than that of the rib 31 can pass through the through hole 313 to be firmly secured to the inserting hole 16. As a consequent, the retaining plate 3 can be lifted or descended with respect to the cup body 1.

Although the present invention has been described with reference to the preferred embodiments, it will be understood that the invention is not limited to the details described thereof. Various substitutions and modifications have been suggested in the foregoing description, and others will occur to those of ordinary skill in the art. For example, the present invention can be used to infusing coffee, cocoa, or other Chinese medicine Therefore, all such substitutions and modifications are intended to be embraced within the scope of the invention as defined in the appended claims.

What is claimed is:

1. An infusing apparatus adapted for making tea comprising:

(a) a longitudinally extended cup body having a hole formed through a bottom portion thereof, said cup body including a radially extending mask portion formed about said bottom portion and a plurality of leg plates extending longitudinally therefrom, said mask defining an inner portion;

(b) a filtering net coupled to said bottom portion of said cup body;

(c) a movable stop disposed between said filtering net and said cup body bottom portion;

(d) a retaining plate coupled to said cup body, said retaining plate being longitudinally displaceable relative to said cup body between first and second positions, said retaining plate having formed therein a plurality of through holes respectively engaging said leg plates of said cup body and being substantially enveloped diametrically by said mask inner portion, said retaining plate including a central portion having formed thereon a plurality of ribs defining therebetween a plurality of via holes; and, (e) a rod coupled to at least one of said movable stop and said retaining plate central portion to extend longitudinally into said hole of said cup body;

said retaining plate being gravity biased to said first position wherein said rod remains positioned relative to said cup body to permit said movable stop to remain seated upon said hole, said retaining plate in said second position maintaining said rod in sufficient position relative to said cup body to unseat said movable stop from said hole;

whereby said bottom portion of said cup body is substantially sealed to retain a liquid therein when said retaining plate is in said first position, and unsealed to release the liquid through said hole thereof and via holes of said retaining plate when said retaining plate is in said second position.

2. The infusing apparatus as recited in claim 1 wherein said cup body includes a plurality of longitudinally extended long grooves recessed into a rim portion thereof adjacent said bottom portion to be angularly spaced one from the other, said central portion of said retaining plate having formed thereon a plurality of radially extending posts slidably engaging said long grooves of said cup body rim portion.

3. The infusing apparatus as recited in claim 1 wherein said cup body has formed through a rim portion thereof adjacent said bottom portion a plurality of longitudinally extended long holes angularly spaced one from the other, and said central portion of said retaining plate has formed thereon a plurality of radially extending posts slidably engaging said long holes of said cup body rim portion.

4. The infusing apparatus as recited in claim 1 further comprising a plurality of pins engaging said retaining plate and cup body for adjusting said first position of said retaining plate relative to said cup body.

5. The infusing apparatus as recited in claim 4 wherein said bottom portion of said cup body has formed therein a plurality of engaging holes, and said ribs of said retaining plate each has formed therein a longitudinal through hole aligned with one said engaging hole to receive one said pin.

6. The infusing apparatus as recited in claim 1 wherein said movable stop is configured as a roller.

7. The infusing apparatus as recited in claim 1 further comprising an elastic stopping ring engaging said hole of said cup body bottom portion.

8. The infusing apparatus as recited in claim 1 wherein said filtering net includes a plurality of positioning pieces extending longitudinally therefrom for limiting said movable stop.

9. The infusing apparatus as recited in claim 1 wherein said movable stop includes a stopping block portion, said rod extending longitudinally between said stopping block portion and said retaining plate central portion.

10. The infusing apparatus as recited in claim 9 wherein a first end of said rod is coupled to said stopping block and a second end of said rod engages a concave hole formed into said central portion of said retaining plate.

11. The infusing apparatus as recited in claim 9 wherein said stopping block is formed with a round ball configuration.

12. The infusing apparatus as recited in claim 9 wherein said stop block is formed with a half round configuration.

13. The infusing apparatus as recited in claim 9 wherein said stopping block is formed with a prismatic block configuration.

* * * * *